(12) United States Patent
Furuyama (10) Patent No.: US 8,777,335 B2
(45) Date of Patent: Jul. 15, 2014

(54) BRAKE CONTROL APPARATUS

(75) Inventor: Hiroshi Furuyama, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 412 days.

(21) Appl. No.: 13/084,601

(22) Filed: Apr. 12, 2011

(65) Prior Publication Data

US 2012/0007418 A1  Jan. 12, 2012

(30) Foreign Application Priority Data

Jul. 9, 2010 (JP) .................................. 2010-156527

(51) Int. Cl.
*B60T 8/60* (2006.01)
(52) U.S. Cl.
USPC ................................ 303/155; 303/11; 303/15
(58) Field of Classification Search
USPC .................. 303/114.1, 155, 152, 3, 10, 11, 15
See application file for complete search history.

(56) References Cited

U.S. PATENT DOCUMENTS

| | | | |
|---|---|---|---|
| 2009/0039702 A1* | 2/2009 | Nishino et al. | 303/114.1 |
| 2009/0096279 A1 | 4/2009 | Hosaka et al. | |
| 2010/0253137 A1* | 10/2010 | Matsuzaki et al. | 303/155 |
| 2011/0049970 A1* | 3/2011 | Hironaka | 303/6.01 |

FOREIGN PATENT DOCUMENTS

| | | | |
|---|---|---|---|
| JP | 11020638 A | * | 1/1999 |
| JP | 2009-107612 A | | 5/2009 |

* cited by examiner

*Primary Examiner* — Melanie Torres Williams
(74) *Attorney, Agent, or Firm* — Crowell & Moring LLP (57) ABSTRACT

A brake control apparatus has a master cylinder pressure detection section that detects a master cylinder pressure produced by driver's brake operation, a pump that draws brake fluid in a master cylinder and discharges the brake fluid to a wheel cylinder that is provided in a wheel, and a control unit that controls a wheel cylinder pressure in response to the detected master cylinder pressure. The control unit has a master cylinder pressure correction section that corrects the detected master cylinder pressure in accordance with a discharge flow quantity of the pump, and a wheel cylinder pressure control section that controls the wheel cylinder pressure by the brake fluid discharged from the pump on the basis of the corrected master cylinder pressure.

17 Claims, 7 Drawing Sheets

BRAKE CONTROL APPARATUS

BACKGROUND OF THE INVENTION

The present invention relates to a brake control apparatus that controls hydraulic pressure of a wheel cylinder.

A related art brake control apparatus has been disclosed in, for example, Japanese Patent Provisional Publication No. 2009-107612 (hereinafter is referred to as "JP2009-107612").

JP2009-107612 discloses a brake assist control that, when a predetermined condition is satisfied at a driver's brake pedal operation, increases pressure of a wheel cylinder by a pump operation. As an estimated value of driver's brake operation quantity, a base pressure is calculated on the basis of a master cylinder pressure sensor value and a pressure increase quantity of a pump, then the wheel cylinder pressure control is performed on the basis of this base pressure.

SUMMARY OF THE INVENTION

In the brake assist control in JP2009-107612, the base pressure is calculated on the basis of the pressure increase quantity of the pump which is determined in accordance with a drive command of the pump. However, since there is a difference in hydraulic pressure rigidity between piping connecting a master cylinder and a hydraulic unit and piping connecting the hydraulic unit and the wheel cylinder, an error arises in the calculation based on a pressure change. Because of this, a proper or correct base pressure cannot be obtained, then this gives an awkward feeling or an odd feeling to a driver when the driver operates the brake pedal.

It is therefore an object of the present invention to provide a brake control apparatus that is capable of the brake assist without giving the awkward feeling to the driver.

According to one aspect of the present invention, a brake control apparatus comprises: a master cylinder pressure detection section that detects a master cylinder pressure produced by driver's brake operation; a pump that draws brake fluid in a master cylinder and discharges the brake fluid to a wheel cylinder that is provided in a wheel; and a control unit that controls a wheel cylinder pressure in response to the detected master cylinder pressure, and the control unit has (a) a master cylinder pressure correction section that corrects the detected master cylinder pressure in accordance with a discharge flow quantity of the pump; and (b) a wheel cylinder pressure control section that controls the wheel cylinder pressure by the brake fluid discharged from the pump on the basis of the corrected master cylinder pressure.

According to another aspect of the present invention, a brake control apparatus comprises: a master cylinder pressure detection section that detects a master cylinder pressure produced by driver's brake operation; a pump that draws brake fluid in a master cylinder and discharges the brake fluid to a wheel cylinder that is provided in a wheel; and a control unit having (a) a master cylinder pressure correction section that estimates, from a discharge flow quantity of the pump, a reduction amount of the master cylinder pressure which is caused by the suction of the brake fluid by the pump, and makes a correction to the detected master cylinder pressure by adding a pressure equivalent to the estimated master cylinder pressure reduction amount to the detected master cylinder pressure; and (b) a wheel cylinder pressure control section that controls a wheel cylinder pressure so as to increase by driving the pump on the basis of the corrected master cylinder pressure when detecting a predetermined state of the detected master cylinder pressure.

According to a further aspect of the invention, a brake control apparatus comprises: a master cylinder pressure detection section that detects a master cylinder pressure produced by driver's brake operation; a pump that draws brake fluid in a master cylinder and discharges the brake fluid to a wheel cylinder that is provided in a wheel; and a control unit having (a) a master cylinder pressure correction section that estimates, from a discharge flow quantity of the pump, a reduction amount of the master cylinder pressure which is caused by the suction of the brake fluid by the pump, and makes a correction to the detected master cylinder pressure by adding a pressure equivalent to the estimated master cylinder pressure reduction amount to the detected master cylinder pressure; and (b) a wheel cylinder pressure control section that drives the pump with the corrected master cylinder pressure being a reference pressure, and controls a wheel cylinder pressure so as to increase with respect to the reference pressure.

According to the present invention, deceleration which the driver intends or deceleration along the driver's intention can be obtained, and the awkward feeling which the driver feels or suffers can be avoided.

The other objects and features of this invention will become understood from the following description with reference to the accompanying drawings.

DETAILED DESCRIPTION OF THE INVENTION

Embodiments of a brake control apparatus of the present invention will be explained below with reference to the drawings.

Embodiment 1

Figure 1:
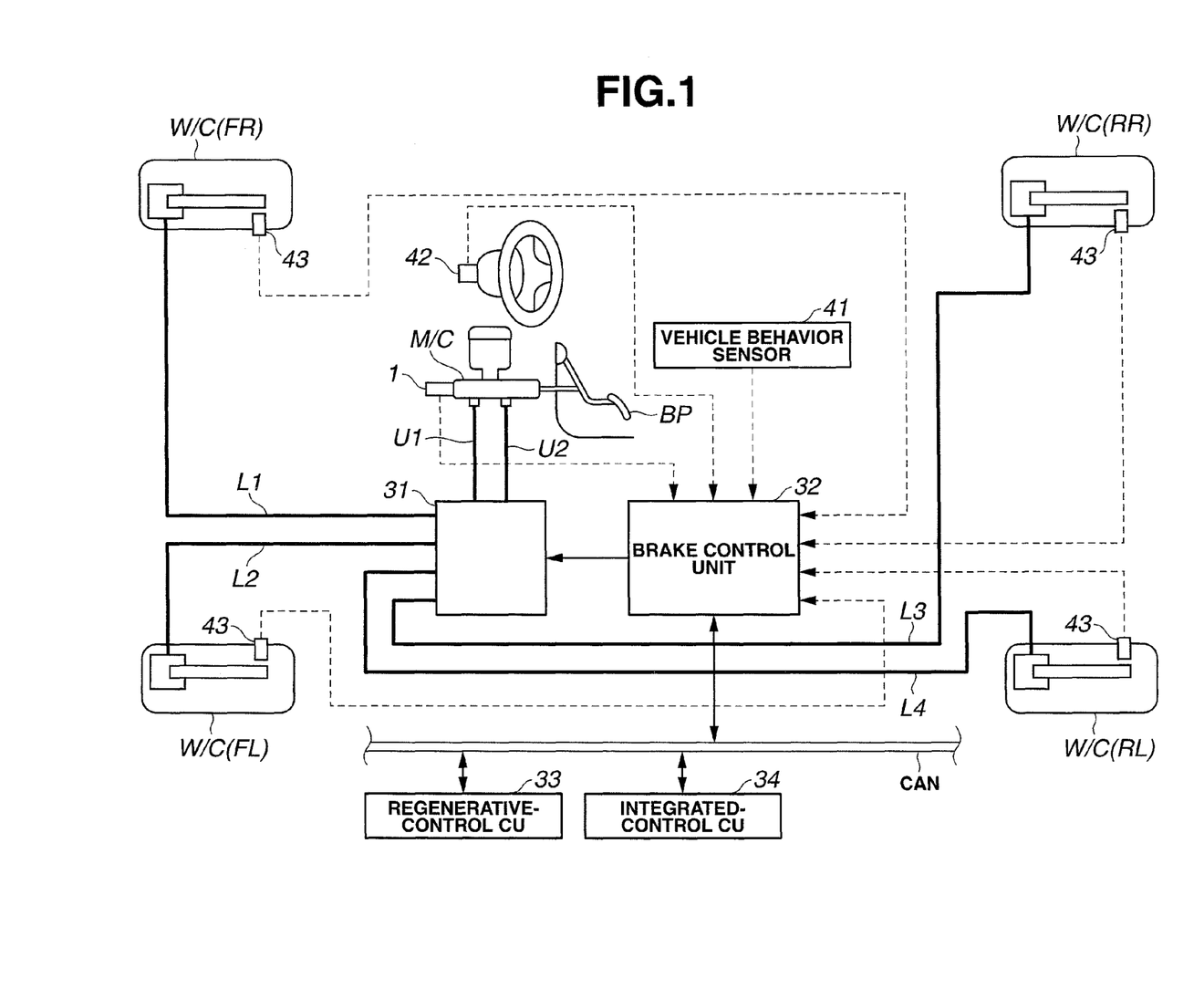
FIG. 1 is a system block diagram of a vehicle employing a brake control apparatus of an embodiment 1.

FIG. 1 is a system block diagram of a vehicle employing a brake control apparatus of an embodiment 1. The vehicle in the embodiment 1 is a hybrid vehicle having a motor/generator as a driving source or an electric vehicle.

An integrated-control control unit 34 executes a control that outputs a driving force in accordance with driver's accelerator pedal operation etc.

A regenerative-control control unit 33 performs a cooperative or coordinated control between a hydraulic braking force and an electrical regenerative braking force, and outputs a control command to a brake control unit 32 and the integrated-control control unit 34, at an operation of a brake pedal BP. Desired deceleration is then achieved.

The brake control unit 32, the regenerative-control control unit 33 and the integrated-control control unit 34 are connected to a CAN communication line CAN. These control units control a travelling condition or running state of the vehicle by sending/receiving sensor information and control signals to/from each other.

Each wheel (FR, FL, RR and RL) has a wheel cylinder W/C that produces the hydraulic braking force and a wheel speed sensor 43 that detects a wheel speed. Further, a steering angle sensor 42 to detect a steering angle operated by the driver and a vehicle behavior sensor 41 to detect vehicle behavior (lateral acceleration, longitudinal acceleration, yaw rate, etc.) and a master cylinder pressure sensor (a master cylinder pressure detection section) 1 to detect a master cylinder pressure that represents driver's brake pedal operation state, are provided. Here, as driver's brake pedal operation quantity, not only the master cylinder pressure but a brake pedal stroke or a brake pedal depression force could be detected. Further, instead of a detection signal of the longitudinal acceleration, an ON signal of a brake lamp switch could be used.

The brake control unit 32 calculates (or computes) the control signal on the basis of each detected sensor signal, in addition to the control signals received via the CAN communication line CAN, and outputs a control command signal to a hydraulic pressure control unit 31. Configuration of the hydraulic pressure control unit 31 will be explained later.

The brake pedal BP is connected to a tandem type master cylinder M/C that produces pressure by the driver's brake pedal BP operation. An inside of the master cylinder is separated into a primary chamber (not shown) and a secondary chamber (not shown). The primary chamber is connected to a P line piping U1 that secures the braking force for the left front (FL) wheel and the right rear (RR) wheel, while the secondary chamber is connected to an S line piping U2 that secures the braking force for the right front (FR) wheel and the left rear (RL) wheel (hereinafter, these P line piping U1 and S line piping U2 are called an upstream side piping U).

The upstream side piping U is connected to the hydraulic pressure control unit 31. The hydraulic pressure control unit 31 is connected to each wheel cylinder W/C through pipings L1, L2, L3 and L4 (hereinafter, called a downstream side piping L).

As shown in FIG. 1, a piping length from the master cylinder M/C to the hydraulic pressure control unit 31 is shorter than a piping length from the hydraulic pressure control unit 31 to each wheel cylinder W/C.

[Whole Configuration of Brake Control Apparatus]

Figure 2:
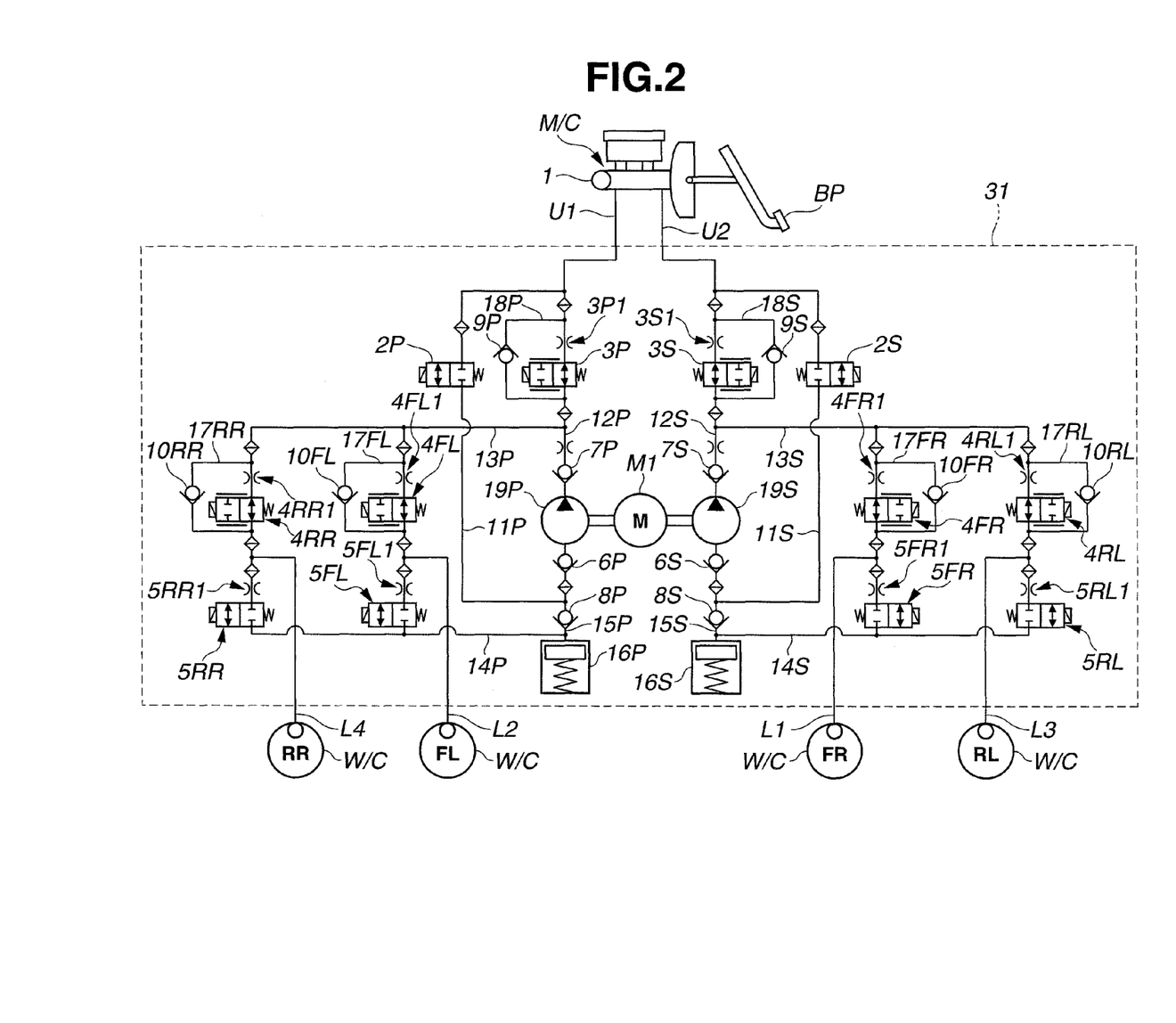
FIG. 2 is a hydraulic circuit in a hydraulic pressure control unit of the embodiment 1.

FIG. 2 is a hydraulic circuit in the hydraulic pressure control unit 31. In the hydraulic pressure control unit 31, the P line pipe is connected to the wheel cylinder W/C (FL) of the left front (FL) wheel and the wheel cylinder W/C (RR) of the right rear (RR) wheel. The S line pipe is connected to the wheel cylinder W/C (FR) of the right front (FR) wheel and the wheel cylinder W/C (RL) of the left rear (RL) wheel. A gear pump 19P is provided in the P line pipe, and a gear pump 19S is provided in the S line pipe. These gear pumps 19P and 19S are driven by a motor Ml.

The master cylinder M/C and each suction side of the gear pumps 19P and 19S (hereinafter, simply described as the gear pump 19) are connected by pipes 11P and 11S (hereinafter, simply described as the pipe 11) respectively connecting to the pipings U1 and U2. On the each pipe 11, gate-in valves 2P and 2S of a normally-closed electromagnetic valve are provided. Further, between the gate-in valves 2P and 2S (hereinafter, simply described as the gate-in valve 2) and the gear pump 19 in the pipe 11, check valves 6P and 6S (hereinafter, simply described as the check valve 6) are provided. This check valve 6 allows a flow of brake fluid in a direction from the gate-in valve 2 toward the gear pump 19, and forbids a brake fluid flow of the opposite direction.

On the other hand, a discharge or delivery side of the each gear pump 19 and the each wheel cylinder W/C (the downstream side piping L) are connected by pipes 12P and 12S (hereinafter, simply described as the pipe 12). On the each pipe 12, solenoid-in valves 4FL, 4RR, 4FR and 4RL (hereinafter, simply described as the solenoid-in valve 4) of a normally-open proportional control electromagnetic valve are provided. These solenoid-in valves 4FL, 4RR, 4FR and 4RL belong to the respective wheel cylinders of W/C (FL), W/C (RR), W/C (FR) and W/C (RL), as illustrated in FIG. 2.

Further, between the each solenoid-in valve 4 and the gear pump 19 in the pipe 12, check valves 7P and 7S (hereinafter, simply described as the check valve 7) are provided. This check valve 7 allows a flow of the brake fluid in a direction from the gear pump 19 toward the solenoid-in valve 4, and forbids a brake fluid flow of the opposite direction.

As shown in the drawing, orifices 4FL1, 4RR1, 4FR1 and 4RL1 are provided at a master cylinder side of each solenoid-in valve 4.

Furthermore, pipes 17FL, 17RR, 17FR and 17RL (hereinafter, simply described as the pipe 17) are provided on the each pipe 12. The pipe 17 bypasses the respective solenoid-in valves 4. On the each pipe 17, check valves 10FL, 10RR, 10FR and 10RL (hereinafter, simply described as the check valve 10) are provided. This check valve 10 allows a flow of the brake fluid in a direction from the wheel cylinder W/C toward the gear pump 19, and forbids a brake fluid flow of the opposite direction.

The master cylinder M/C and the each pipe 12 are connected by pipes 13P and 13S (hereinafter, simply described as the pipe 13). The pipe 12 and the pipe 13 meet between the gear pump 19 and the solenoid-in valve 4. On the each pipe 13, gate-out valves 3P and 3S (hereinafter, simply described as the gate-out valve 3) of a normally-open proportional control electromagnetic valve are provided. Between the master cylinder M/C and the gate-out valve 3, orifices 3P1 and 3S1 are provided.

As can be seen in FIG. 2, pipes 18P and 18S (hereinafter, simply described as the pipe 18) are provided on the respective pipes 13. This pipe 18 bypasses the gate-out valve 3. On the each pipe 18, check valves 9P and 9S (hereinafter, simply described as the check valve 9) are provided. This check valve 9 allows a flow of the brake fluid in a direction from the master cylinder M/C toward the wheel cylinder W/C, and forbids a brake fluid flow of the opposite direction.

In the hydraulic circuit, reservoirs 16P and 16S (hereinafter, simply described as the reservoir 16) are also installed at the suction side of the gear pump 19. The each reservoir 16 and the each gear pump 19 are connected by pipes 15P and 15S (hereinafter, simply described as the pipe 15) respectively. Between the reservoir 16 and the gear pump 19, check valves 8P and 8S (hereinafter, simply described as the check valve 8) are provided. This check valve 8 allows a flow of the brake fluid in a direction from the reservoir 16 toward the gear pump 19, and forbids a brake fluid flow of the opposite direction.

The wheel cylinder W/C and the pipe 15 are connected by pipes 14P and 14S (hereinafter, simply described as the pipe 14). The pipe 14 and the pipe 15 meet between the check valve 8 and the reservoir 16. On the each pipe 14, solenoid-out valves 5FL, 5RR, 5FR and 5RL (hereinafter, simply described as the solenoid-out valve 5) of a normally-closed electromagnetic valve are provided. As shown in the drawing, orifices 5FL1, 5RR1, 5FR1 and 5RL1 are provided at a wheel cylinder side of each solenoid-out valve 5.

Each solenoid valve (the gate-in valve 2, the gate-out valve 3, the solenoid-in valve 4 and the solenoid-out valve 5) is controlled by the brake control unit 32. The brake control unit 32 performs a brake assist control that adds a braking force, an anti-skid brake control (ABS) that avoids lock of the wheel and a vehicle dynamics control (VDC) that stabilizes the vehicle behavior, on the basis of the control signals from the other control units and the input signals from each sensor. Further, the brake control unit 32 performs computation to control tire slip and the vehicle behavior using vehicle information such as a vehicle distance control and an obstruction avoidance control from the other controllers, and calculates the braking force (for each wheel) required of the vehicle. The brake control unit 32 then computes or calculates a braking force target value required for each wheel, and outputs the control command.

[Brake Assist Control]

Figure 3:
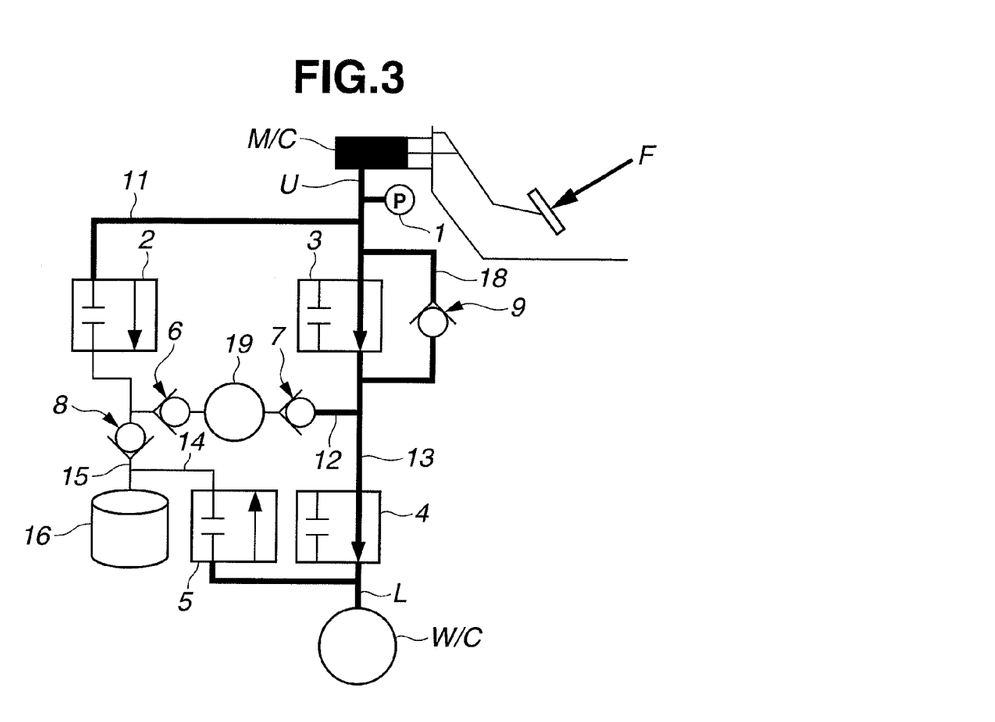
FIG. 3 is a schematic view showing a flow of brake fluid according to driver's brake pedal operation, of the embodiment 1.
Figure 4:
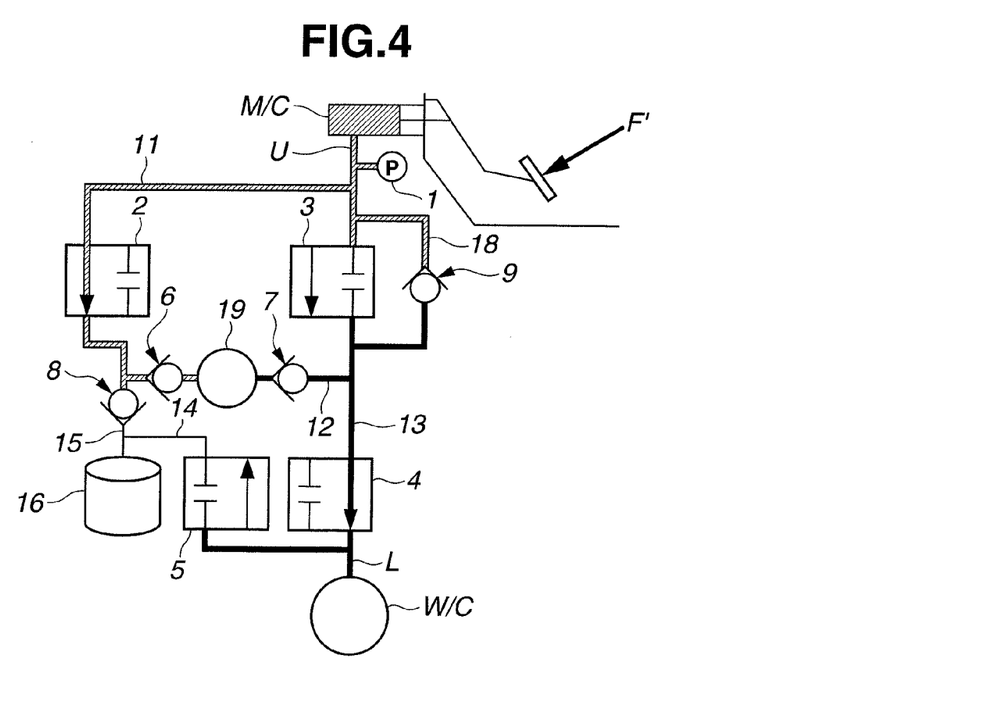
FIG. 4 is a schematic view showing a flow of brake fluid according to a pressure control by the hydraulic pressure control unit, of the embodiment 1.

FIG. 3 is a schematic view showing a flow of the brake fluid according to the driver's brake pedal operation. FIG. 4 is a schematic view showing a flow of the brake fluid according to the pressure control by the hydraulic pressure control unit 31.

As shown in FIG. 3, in a non-control state, the gate-in valve 2 and the solenoid-out valve 5 are in the closed state, and the gate-out valve 3 and the solenoid-in valve 4 are in the open state. When the driver depresses the brake pedal BP with a certain depression force F, the brake pedal BP is pressed down, and the brake fluid in the master cylinder M/C is pushed out to the upstream side piping U. The brake fluid pushed out to the upstream side piping U flows into the pipe 13 (the pipe 18) through the gate-out valve 3 and is supplied to the downstream side piping L through the solenoid-in valve 4, then is supplied to the wheel cylinder W/C.

When the brake assist control is performed in this state, as shown in FIG. 4, the gate-out valve 3 is closed, the gate-in valve 2 is opened, and the gear pump 19 is driven. Then the brake fluid in the master cylinder M/C is drawn (or pumped up from the master cylinder M/C) through the upstream side piping U, the pipe 11 and the gate-in valve 2, and is discharged to the pipe 12. The brake fluid pumped out from the gear pump 19 flows to the pipe 13 that connects with the pipe 12, and is supplied to the downstream side piping L, thereby increasing the wheel cylinder pressure.

Here, an electromagnetic force of such magnitude as to be able to maintain a pressure difference between the master cylinder side and the wheel cylinder side is exerted on the gate-out valve 3.

On the other hand, since the brake fluid on the master cylinder side of the gate-out valve 3 (including the upstream side piping U) is decreased by the suction or pumping-up by the gear pump 19, the master cylinder pressure reduces. Here, even when the driver depresses the brake pedal BP with the intention of applying the same brake, since a decrease speed of the brake fluid by the suction of the gear pump 19 is high and hydraulic pressure rigidity of the upstream side piping U is high, the brake fluid quantity is lowered before a stroke of the brake pedal BP actually starts or occurs, and the pressure reduction occurs. In general, in a case where the driver operates the brake pedal BP, the driver actually feels or senses the deceleration etc. occurring to the vehicle, then the driver does the brake pedal operation in accordance with this sense. In other words, the driver does not control the depression force nor the brake pedal stroke, but performs the brake pedal operation based on the deceleration actually occurring. Thus, even if the master cylinder pressure changes, as long as the deceleration occurs, the driver does not particularly feel the awkward feeling or the odd feeling.

Figure 5:
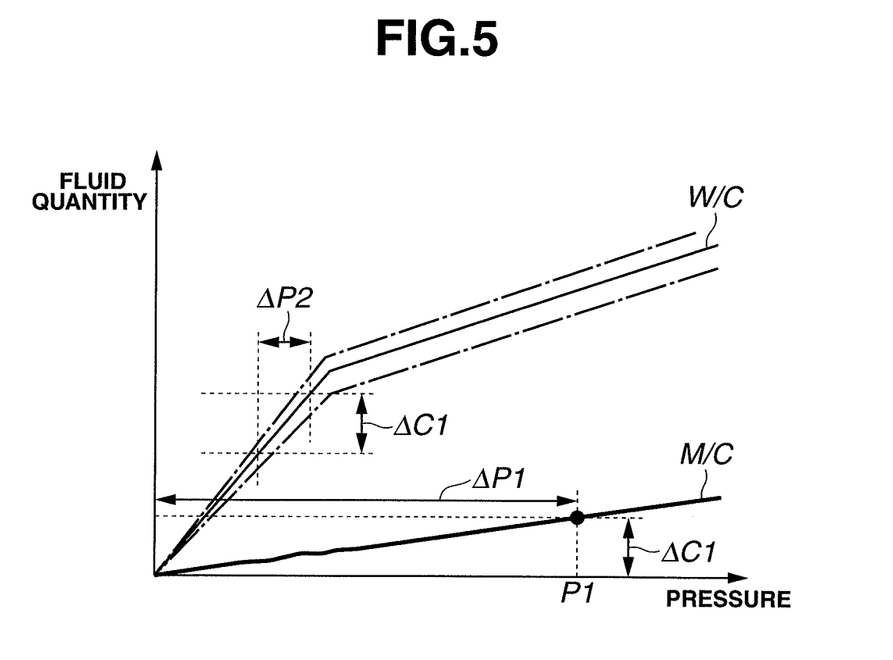
FIG. 5 is a drawing showing pressure-fluid quantity characteristics in the brake control apparatus of the embodiment 1.

FIG. 5 is a drawing showing pressure-fluid quantity characteristics in the brake control apparatus. In FIG. 5, a bold solid line represents a master cylinder pressure-fluid quantity characteristic of the master cylinder M/C. A thin solid line (or dashed lines) represents a wheel cylinder pressure-fluid quantity characteristic of the wheel cylinder W/C. Regarding the master cylinder M/C, since the upstream side piping U is short and its hydraulic pressure rigidity is high, when the fluid quantity changes by $\Delta c1$ in the master cylinder M/C, the master cylinder pressure changes by $\Delta p1$. That is to say, a pressure change (or a pressure variation) with respect to the fluid quantity change (or a fluid quantity variation) is extremely large.

On the other hand, with regard to the wheel cylinder W/C, especially at the beginning of the brake, a capacity (or volume) change tends to occur during piston stroke in the wheel cylinder W/C until a brake pad is firmly pressed against a brake rotor. Additionally, because the length of the downstream side piping L is considerably longer than that of the upstream side piping U, the hydraulic pressure rigidity of the downstream side piping L at the beginning of the brake is low. Characteristics of this hydraulic pressure rigidity are slightly different even depending on the length of the pipe and variations of the wheel cylinder volume. Therefore, when the fluid quantity changes by $\Delta c1$ in the wheel cylinder W/C, the change of the wheel cylinder pressure is only about $\Delta p2$ that is smaller than $\Delta p1$. That is to say, the pressure change (or the pressure variation) with respect to the fluid quantity change (or the fluid quantity variation) is extremely small.

Here, the brake assist control is a control that maintains or increases the deceleration by adding the wheel cylinder pressure by the pump drive through the control, to the braking force produced in accordance with the depression force when the driver depresses the brake pedal BP. With this control, the driver can feel or sense an adequate deceleration.

However, the brake fluid is drawn or pumped up from the master cylinder side by the pump and is supplied to the wheel cylinder side, the braking force is then added by this action. For this reason, when the fluid pressure in the master cylinder varies, there is a risk that the driver's proper intention to apply the brake becomes unclear or uncertain during the control.

Accordingly, a master cylinder pressure sensor value is corrected or compensated in accordance with the control, then a correction master cylinder pressure is controlled as a value representing the driver's intention. In the embodiment 1, upon the calculation of the correction master cylinder pressure, by performing the control on the basis of a quantity of the pump discharge flow, the driver's intention can be accurately detected. In the following description, the brake assist control process will be explained.

[Brake Assist Control Process]

Figure 6:
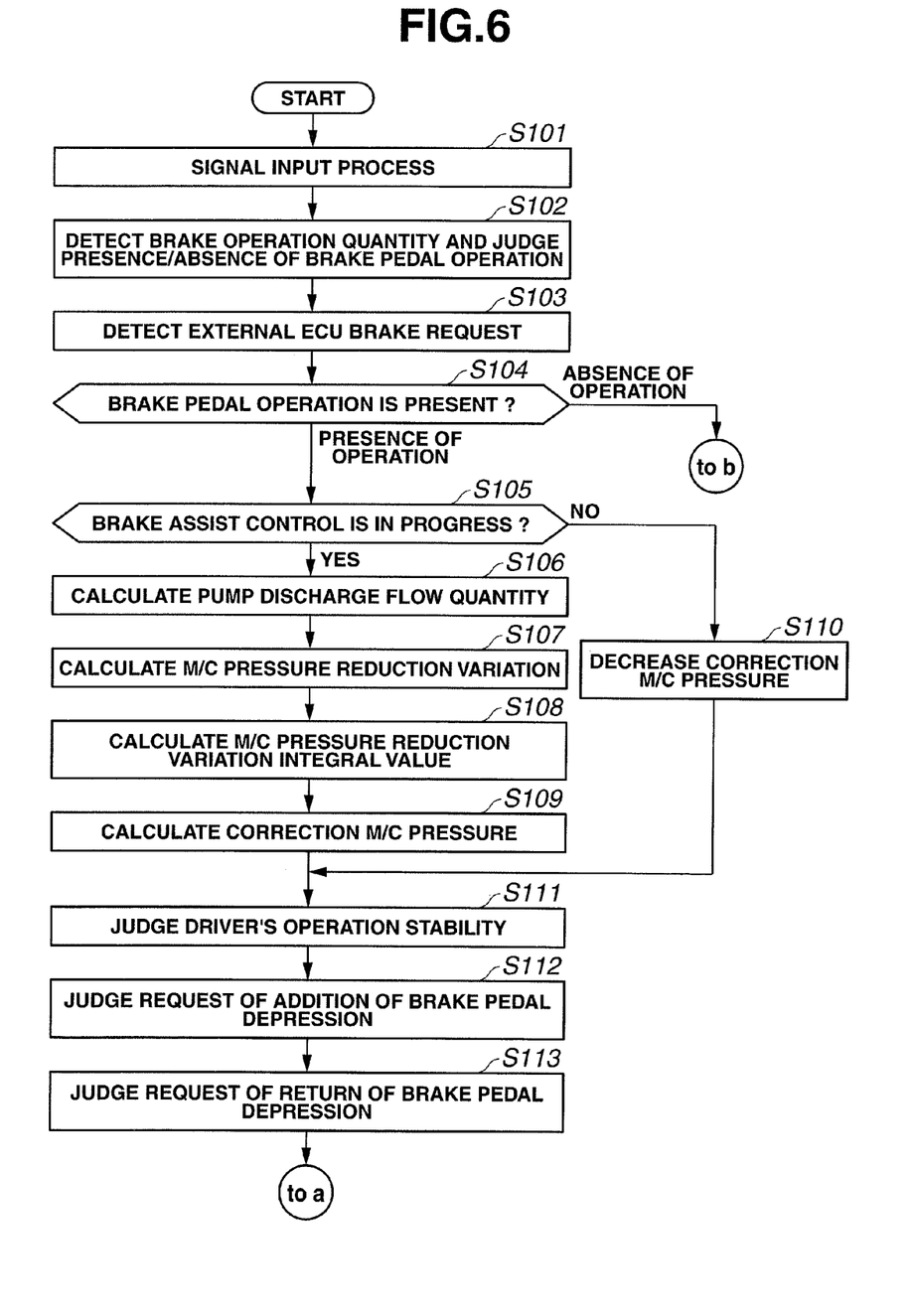
FIG. 6 is a flow chart showing a flow of a brake assist control process of the embodiment 1.
Figure 7:
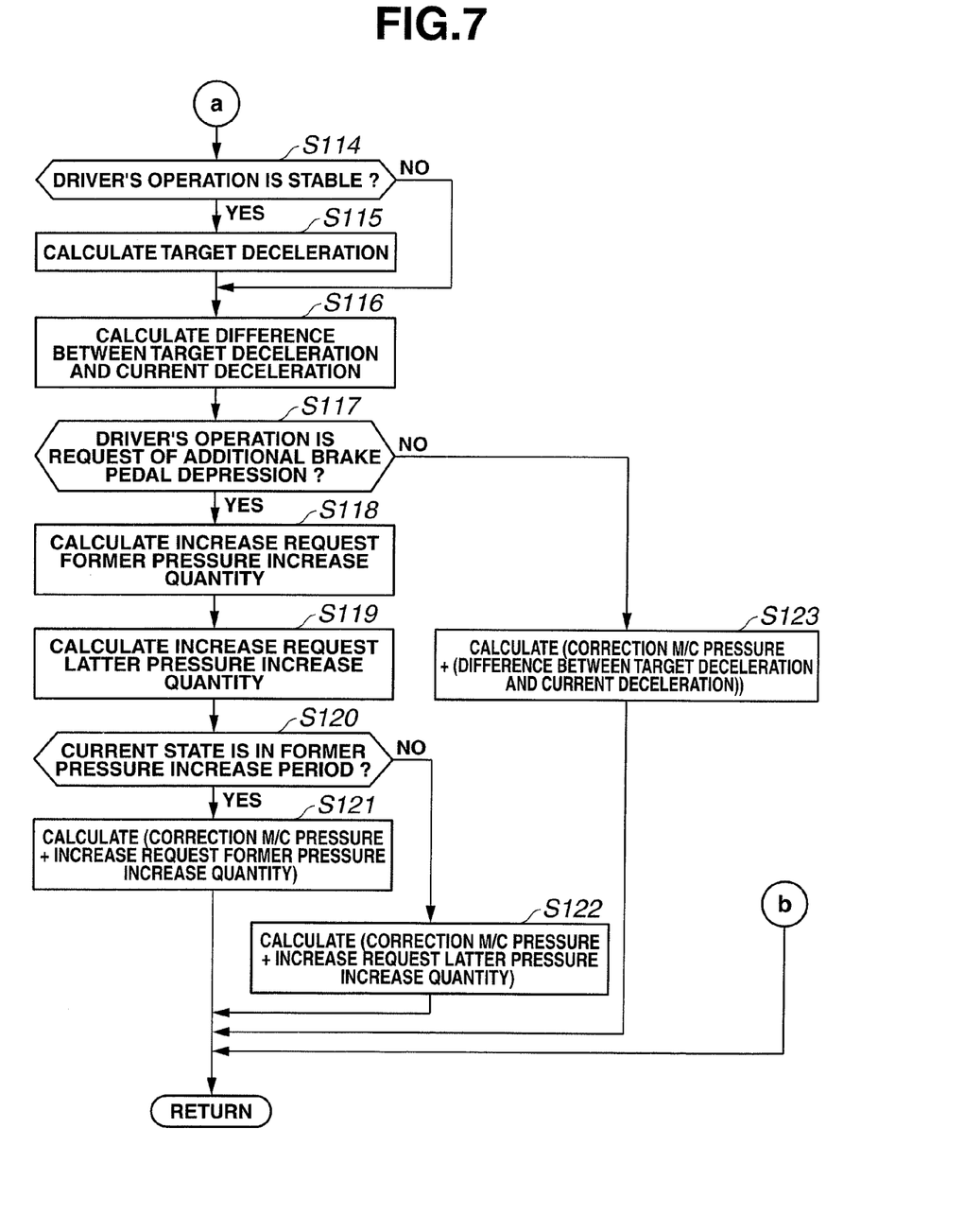
FIG. 7 is a flow chart showing a flow of a brake assist control process of the embodiment 1.

FIGS. 6 and 7 are flow charts showing flows of the brake assist control process. In the present control, the process of computation is repeatedly executed at a certain operation (or control) cycle period in the brake control unit 32, and the control signal is outputted to the hydraulic pressure control unit 31 on the basis of the calculated (or computed) command.

At step S101, an input process of each sensor signal is performed. Raw data (raw value) of the sensor signal is read as a signal having passed through a shell-encased low-pass filter that is unaffected by an aliasing noise, in accordance with a read cycle of each controller etc. After that, a low-pass filter process that removes superimposition of vehicle body vibrations and electrical noise is performed. Low-pass filter frequency characteristics are set to such frequencies that a change of the pressure and a change of the vehicle behavior can be properly or adequately detected even when the driver does an abrupt operation.

At step S102, a signal of the master cylinder pressure sensor 1, by which the driver's brake pedal operation is detected, is detected all the time from the input sensor signal. Further, when the detected pressure is greater than a predetermined pressure Px (e.g. a value that indicates an additional depression operation, like 0), it is judged that the driver's brake pedal operation is present. Here, regarding the predetermined pressure Px, it is preferable that the predetermined pressure Px be set to a value having a margin by which a detection error can be avoided with consideration given to an error of the master cylinder pressure sensor 1.

At step S103, an equivalent master cylinder pressure based on a brake request sent from the external control units via the CAN communication line CAN is detected. The detection signal could be not only a master cylinder-equivalent pressure but also a vehicle body deceleration and a vehicle braking force, etc. These vehicle body deceleration and vehicle braking force can be used by being converted to the master cylinder-equivalent pressure through specifications or characteristics of the brake of the vehicle.

At step S104, a judgment is made as to whether or not the brake pedal is operated by the presence or absence of the brake pedal operation detected at step S102. If judged that the brake pedal operation is present, the routine proceeds to step S105. If judged that the brake pedal operation is absent, the present control flow is terminated.

At step S105, a judgment is made as to whether or not the braking force control by the brake assist control is in progress. If YES (the braking force control is in progress), the routine proceeds to step S106. If NO (the braking force control is not in progress), the routine proceeds to step S110.

At step S106, the discharge flow quantity of the pump 19 is calculated. More specifically, a difference between each wheel cylinder pressure at the current control cycle and each wheel cylinder pressure to be required at the next control cycle is calculated. Then, on the basis of a pre-stored known wheel cylinder pressure-fluid quantity characteristic, a fluid quantity to be discharged at this control cycle is calculated.

At step S107, the master cylinder pressure that is thought to reduce by the discharge of the pump 19 is calculated. More specifically, the master cylinder pressure varying depending on the fluid quantity flowing (or moving) from the master cylinder side to the wheel cylinder side which is the discharge flow quantity calculated at step S106, is calculated on the basis of a pre-stored known master cylinder pressure-fluid quantity characteristic.

At step S108, by integrating an amount of the reduction of the pressure that is though to reduce at the current control cycle, a reduction amount integral value is calculated. With this, a master cylinder pressure reduction amount which is added or increases with a lapse of time is calculated. In other words, a master cylinder pressure reduction amount integral value obtained by integrating the master cylinder pressure that reduces at each predetermined time is calculated. Here, this correction is made only during the performance of the brake assist control.

When the brake assist control is cancelled, the routine proceeds to step S110. Then the correction master cylinder pressure is decreased at a predetermined slope or gradient on the basis of a pre-set master cylinder pressure decrease amount, and the correction master cylinder pressure is finally fitted to an actual master cylinder pressure.

At step S109, by adding the master cylinder pressure reduction amount integral value calculated at step S108 to the actual master cylinder pressure detected by the master cylinder pressure sensor 1, the correction master cylinder pressure is calculated.

At step S111, a driver's operation stability judgment is performed on the basis of the correction master cylinder pressure. More specifically, if a time variation of the correction master cylinder pressure is smaller than or equal to a certain value ($\Delta Pa$), it is judged that the driver's brake pedal operation is stable. In other words, since this flow chart is repeatedly executed and computed at the certain operation cycle period, when the additional depression (i.e. further depression of the brake pedal or increase in the brake pedal depression degree) and a back depression (i.e. return of the brake pedal depression or decrease in the brake pedal depression degree) are not detected for a certain time period by a judgment of the addition of the brake pedal depression at an after-mentioned step S112 and a judgment of the return of the brake pedal depression at an after-mentioned step S113, driver's operation state is judged to be stable.

At step S112, a judgment is made as to whether or not the driver requests the addition of the brake pedal depression (whether or not increase in the deceleration is required by the operation such as the stroke of the brake pedal BP by the brake pedal depression and increase of the depression force). More specifically, it is detected whether the time variation of the correction master cylinder pressure is within a predetermined range which is greater than the certain value $\Delta Pa$ and smaller than $\Delta Pb$ that indicates an abrupt (or hard) deceleration and also the time variation shows an increasing tendency. If this is detected, it is judged that the driver feels the inadequacy of the deceleration and a current state is a state in which the driver intends to increase the braking force.

At step S113, a judgment is made as to whether or not the driver requests the return of the brake pedal depression (whether or not decrease in the deceleration is required by the operation such as the stroke of the brake pedal BP by returning the brake pedal and decrease of the depression force). More specifically, it is detected whether the time variation of the correction master cylinder pressure is smaller than or equal to a certain value ($-\Delta Pa$) and also the time variation shows a decreasing tendency. If this is detected, it is judged that the driver feels that deceleration is adequate or a current state is a state in which the driver intends to decrease the deceleration.

At step S114 in FIG. 7, a judgment is made as to whether or not the driver's operation is judged to be still stable at step S111. If YES (the driver's operation is judged to be still stable), the routine proceeds to step S115, and a target deceleration is calculated. If NO, the routine proceeds to step S116. More specifically, a longitudinal acceleration sensor value when the driver's operation is stable or an average of an estimated deceleration that is determined from a wheel speed change when the driver's operation is stable is calculated, and this value is set to the target deceleration. That is, the deceleration at a time point at which the driver's operation is judged to be stable is set to the target deceleration.

At step S116, a difference or deviation between the target deceleration and a current deceleration is calculated. The current deceleration is the current longitudinal acceleration sensor value or an average of the estimated deceleration calculated at the current time point.

At step S117, a judgment is made as to whether or not the driver's operation is judged to be the request of the additional brake pedal depression at step S112. If YES (the driver's operation is judged to be the request of the addition of the brake pedal depression), the routine proceeds to step S118. If NO, the routine proceeds to step S123.

At step S118, an increase request former pressure increase quantity is calculated. More specifically, it is calculated so that the pressure increase quantity is increased by a certain gradient ΔPs for a predetermined time period from the judgment of the request of the addition of the brake pedal depression.

At step S119, an increase request latter pressure increase quantity is calculated. More specifically, it is calculated so that the pressure increase quantity is increased by a certain gradient ΔPa that is gentler than the certain gradient of the former pressure increase after a lapse of the predetermined time period for which the former pressure increase is carried out.

At step S120, a judgment is made as to whether or not the current state is in a former pressure increase period. If YES (the current state is in the former pressure increase period), the routine proceeds to step S121. If NO (if it is judged that the current state is a state after the lapse of the former pressure increase period), the routine proceeds to step S122.

At step S121, by adding the increase request former pressure increase quantity to the correction master cylinder pressure, a final wheel cylinder pressure request value is determined.

At step S122, by adding the increase request latter pressure increase quantity to the correction master cylinder pressure, a final wheel cylinder pressure request value is determined.

Figure 8:
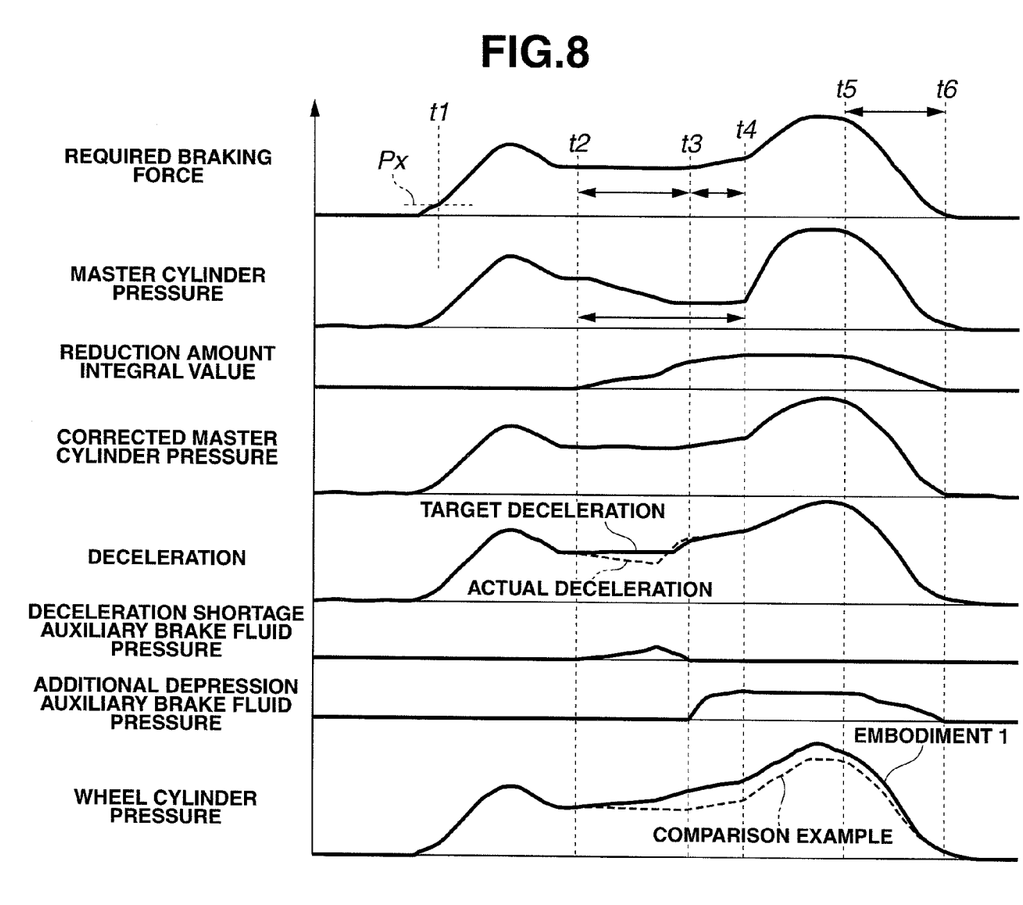
FIG. 8 is a time chart showing the brake assist control process of the embodiment 1.

FIG. 8 is a time chart showing the brake assist control process of the embodiment 1. An initial state is a state in which the vehicle is running at a certain vehicle speed with no driver's operation of the brake pedal BP. In this state, the process from step S101 to step S104 is repeated.

At time t1, when the driver starts to additionally depress the brake pedal BP (the further depression of the brake pedal is started by the driver) and the master cylinder pressure exceeds the predetermined pressure Px, it is judged that the brake pedal operation is present. With this action, the process of steps S104→S105→S110 is performed. Here, the correction master cylinder pressure is the actual master cylinder pressure, and the subtraction operation to the correction master cylinder pressure is not specially performed. Subsequently, after the driver still further depress the brake pedal BP strongly and some braking force is required, a required braking force becomes constant, then the stable brake pedal operation state is maintained.

At time t2, when it is judged that the driver's brake pedal operation is stable (at step S111), the target deceleration is calculated at step S115, then a deceleration occurring at time t2 is set to the target deceleration. And the process of steps S116→S123 is performed, a deceleration feedback control is carried out. With this, since the wheel cylinder pressure is increased by the drive of the pump 19, when an actual deceleration starts to decrease, a brake fluid pressure (a deceleration shortage auxiliary brake fluid pressure) that compensates for shortage of the deceleration is added in accordance with the difference from the target deceleration.

At this time, because the brake fluid is drawn from the master cylinder side, the master cylinder pressure starts to reduce. Then the master cylinder pressure reducing on the basis of the pressure-fluid quantity characteristic shown in FIG. 5 is calculated from a pump drive quantity, i.e. the discharge flow quantity, and by integrating this value, the reduction amount integral value is calculated. Further, by adding the reduction amount integral value to the value of the master cylinder pressure sensor 1, the correction master cylinder pressure is calculated. In this case, since the driver does not specially make the increase request of the deceleration, even if the value of the master cylinder pressure sensor 1 is lowered, the correction master cylinder pressure is constant.

In contrast, in a case of a comparison example, the deceleration is gradually decreased with the reduction of the master cylinder pressure, and the driver feels such awkward feeling or odd feeling that the deceleration is inadequate.

At time t3, when the correction master cylinder pressure shows an increasing tendency and the required braking force also shows an increasing tendency during the execution of the deceleration feedback control, it is judged that the request of the addition of the brake pedal depression is present, then the increase request former pressure increase quantity having a relatively large increasing gradient is added for a predetermined time period Tb. After a lapse of the predetermined time period Tb, the increase request latter pressure increase quantity having a relatively small increasing gradient is added.

At time t4, when the driver strongly depresses the brake pedal BP, the master cylinder pressure becomes greater than the wheel cylinder pressure with the increase request latter pressure increase quantity maintained. The brake fluid is then supplied to the wheel cylinder side through the check valve 9, and the wheel cylinder pressure also increases.

At time t5, when the driver starts to return the brake pedal depression and the time variation of the correction master cylinder pressure is smaller than or equal to the certain value and also the time variation shows the decreasing tendency, the brake assist control is cancelled. Then the correction master cylinder pressure is decreased at the predetermined gradient, and the deceleration is decreased. More specifically, by performing a differential pressure control of the gate-out valve 3, the wheel cylinder pressure is decreased in accordance with the decrease in the required deceleration.

As explained above, in the brake control apparatus of the embodiment 1, the following effects are obtained.

(1) A brake control apparatus comprises a master cylinder pressure sensor 1 (a master cylinder pressure detection section) that detects a master cylinder pressure produced by driver's brake operation, a pump 19 that draws brake fluid in a master cylinder M/C and discharges the brake fluid to a wheel cylinder W/C that is provided in a wheel, and a brake control unit 32 (a control unit) that controls a wheel cylinder pressure in response to the detected master cylinder pressure, and the brake control unit 32 has (a) steps S106~S109 (hereinafter, called a master cylinder pressure correction section) that corrects the detected master cylinder pressure in accordance with a discharge flow quantity of the pump 19, and (b) steps S114~S122 (hereinafter, called a wheel cylinder pressure control section) that controls the wheel cylinder pressure by the brake fluid discharged from the pump 19 on the basis of the corrected master cylinder pressure.

That is, since the master cylinder pressure is corrected on the basis of the pump discharge flow quantity, the error arising due to the difference in the hydraulic pressure rigidity can be suppressed. As a consequence, the deceleration which the driver intends or the deceleration along the driver's intention can be obtained, and the awkward feeling which the driver feels or suffers can be avoided.

(2) The pump discharge flow quantity required to control the wheel cylinder pressure by the wheel cylinder pressure control section is calculated on the basis of a wheel cylinder pressure-fluid quantity characteristic.

Thus, the master cylinder pressure can be corrected in accordance with the hydraulic pressure rigidity of the upstream side piping U and the downstream side piping L, a highly accurate control can be realized.

(3) In the steps S106 and S107, the master cylinder pressure that reduces by the suction of the pump 19 is estimated on the basis of the pump discharge flow quantity, and the master cylinder pressure correction section corrects the master cylinder pressure on the basis of the estimated reducing master cylinder pressure.

Thus, it is possible to gain a highly accurate correction master cylinder pressure according to configuration of the brake control apparatus.

(4) In the steps S108 and S109, the reducing master cylinder pressure is a master cylinder pressure reduction amount integral value obtained by integrating the master cylinder pressure that reduces at each predetermined time, and the master cylinder pressure correction section corrects the master cylinder pressure on the basis of the master cylinder pressure reduction amount integral value during the control by the wheel cylinder pressure control section.

Thus, it is possible to gain a highly accurate correction master cylinder pressure according to the reduction flow quantity.

(5) The master cylinder pressure correction section decreases, on the basis of a pre-set master cylinder pressure decrease amount, the correction master cylinder pressure corrected by the master cylinder pressure reduction amount integral value except when the control by the wheel cylinder pressure control section is in progress, and returns the correction master cylinder pressure to the detected master cylinder pressure.

It is therefore possible to gain a highly accurate correction master cylinder pressure without accumulating the master cylinder pressure reduction amount integral value.

(6) The brake control unit 32 further has (c) step S112 (hereinafter, called a brake pedal addition-depression detection section) that detects an additional depression of a brake pedal by which the driver performs the brake operation, (d) step S113 (hereinafter, called a brake pedal return-depression detection section) that detects return of the brake pedal depression, and (e) step S111 (hereinafter, called a driver's operation state stability judgment section) that judges that, when the addition of the brake pedal depression and the return of the brake pedal depression are not detected for a certain time period by the brake pedal addition-depression detection section and the brake pedal return-depression detection section, the driver's operation state is stable, then in step S114, the wheel cylinder pressure is controlled by the wheel cylinder pressure control section with the judgment of the stability of the driver's operation state by the driver's operation state stability judgment section being a control intervention condition.

Therefore, the brake assist control along the driver's intention can be achieved.

(7) The brake control unit 32 further has (f) steps S115, S116 (hereinafter, called a vehicle body deceleration calculation section) that calculates an actual deceleration of a vehicle body, and (g) steps S115, S116 (hereinafter, called a target vehicle body deceleration calculation section) that sets the vehicle body deceleration calculated when judging that the driver's operation state is stable by the driver's operation state stability judgment section to a target vehicle body deceleration, and the wheel cylinder pressure control section increases the wheel cylinder pressure when the calculated target vehicle body deceleration is greater than the actual vehicle body deceleration, and decreases the wheel cylinder pressure when the calculated target vehicle body deceleration is smaller than the actual vehicle body deceleration.

Thus, when the driver's operation state is stable, the deceleration to attain the target deceleration can be achieved.

(8) When the addition of the brake pedal depression is detected by the brake pedal addition-depression detection section during the control intervention, the wheel cylinder pressure control section performs a pressure increase control of the wheel cylinder pressure.

Therefore, the brake assist control along the driver's intention can be achieved.

(9) A brake control apparatus comprises a master cylinder pressure detection section that detects a master cylinder pressure produced by driver's brake operation, a pump that draws brake fluid in a master cylinder and discharges the brake fluid to a wheel cylinder that is provided in a wheel; and a control unit having (a) a master cylinder pressure correction section that estimates, from a discharge flow quantity of the pump, a reduction amount of the master cylinder pressure which is caused by the suction of the brake fluid by the pump, and makes a correction to the detected master cylinder pressure by adding a pressure equivalent to the estimated master cylinder pressure reduction amount to the detected master cylinder pressure, and (b) a wheel cylinder pressure control section that controls a wheel cylinder pressure so as to increase by driving the pump on the basis of the corrected master cylinder pressure when detecting a predetermined state of the detected master cylinder pressure.

That is, when the brake pedal operation is done by the driver and the predetermined state of the detected master cylinder pressure is detected, it is judged that the drive's intention to apply the brake is still present, then the pump is driven and the wheel cylinder pressure is controlled on the basis of the correction master cylinder pressure. With this control, the deceleration along the driver's intention or the adequate deceleration for the driver's intention can be obtained, and the awkward feeling which the driver feels or suffers can be avoided.

(10) The pump discharge flow quantity required to control the wheel cylinder pressure by the wheel cylinder pressure control section is calculated on the basis of a wheel cylinder pressure-fluid quantity characteristic.

Thus, the master cylinder pressure can be corrected in accordance with the hydraulic pressure rigidity of the upstream side piping U and the downstream side piping L, a highly accurate control can be realized.

(11) The reduction amount of the master cylinder pressure is a master cylinder pressure reduction amount integral value obtained by integrating the master cylinder pressure that reduces at each predetermined time.

Thus, it is possible to gain a highly accurate correction master cylinder pressure according to configuration of the brake control apparatus.

(12) The master cylinder pressure correction section decreases, on the basis of a pre-set master cylinder pressure decrease amount, the correction master cylinder pressure corrected by the master cylinder pressure reduction amount integral value except when the control by the wheel cylinder pressure control section is in progress, and returns the corrected master cylinder pressure to the detected master cylinder pressure.

It is therefore possible to gain a highly accurate correction master cylinder pressure without accumulating the master cylinder pressure reduction amount integral value.

(13) The control unit further has (c) a brake pedal addition-depression detection section that detects an additional depression of a brake pedal by which the driver performs the brake operation, and (d) a brake pedal return-depression detection section that detects return of the brake pedal depression, and the predetermined state of the detected master cylinder pressure is a state where the addition of the brake pedal depression and the return of the brake pedal depression are not detected for a certain time period by the brake pedal addition-depression detection section and the brake pedal return-depression detection section, and the wheel cylinder pressure is controlled by the wheel cylinder pressure control section with a judgment of stability of driver's operation state by the detection of the predetermined state being a control intervention condition.

Therefore, the brake assist control along the driver's intention can be achieved.

(14) the control unit further has (e) a vehicle body deceleration calculation section that calculates an actual deceleration of a vehicle body, and (f) a target vehicle body deceleration calculation section that sets the vehicle body deceleration calculated when detecting the predetermined state to a target vehicle body deceleration, and the wheel cylinder pressure control section increases the wheel cylinder pressure when the calculated target vehicle body deceleration is greater than the actual vehicle body deceleration, and decreases the wheel cylinder pressure when the calculated target vehicle body deceleration is smaller than the actual vehicle body deceleration.

Thus, when the driver's operation state is stable, the deceleration to attain the target deceleration can be achieved.

(15) When the addition of the brake pedal depression is detected by the brake pedal addition-depression detection section during the control intervention, the wheel cylinder pressure control section performs a pressure increase control of the wheel cylinder pressure.

Therefore, the brake assist control along the driver's intention can be achieved.

(16) A brake control apparatus comprises: a master cylinder pressure detection section that detects a master cylinder pressure produced by driver's brake operation, a pump that draws brake fluid in a master cylinder and discharges the brake fluid to a wheel cylinder that is provided in a wheel, and a control unit having (a) a master cylinder pressure correction section that estimates, from a discharge flow quantity of the pump, a reduction amount of the master cylinder pressure which is caused by the suction of the brake fluid by the pump, and makes a correction to the detected master cylinder pressure by adding a pressure equivalent to the estimated master cylinder pressure reduction amount to the detected master cylinder pressure, and (b) a wheel cylinder pressure control section that drives the pump with the corrected master cylinder pressure being a reference pressure, and controls a wheel cylinder pressure so as to increase with respect to the reference pressure.

That is, by setting the correction master cylinder pressure as the reference pressure and controlling the wheel cylinder pressure so as to increase with respect to this reference pressure, the adequate deceleration for the driver's intention can be obtained.

(17) The pump discharge flow quantity required to control the wheel cylinder pressure by the wheel cylinder pressure control section is calculated on the basis of a wheel cylinder pressure-fluid quantity characteristic.

Thus, the master cylinder pressure can be corrected in accordance with the hydraulic pressure rigidity of the upstream side piping U and the downstream side piping L, a highly accurate control can be realized.

(18) The control unit estimates, on the basis of the pump discharge flow quantity, the master cylinder pressure that reduces by the suction of the pump, and the master cylinder pressure correction section corrects the master cylinder pressure on the basis of the estimated reducing master cylinder pressure.

Thus, it is possible to gain a highly accurate correction master cylinder pressure according to configuration of the brake control apparatus.

(19) The control unit further has (c) a brake pedal addition-depression detection section that detects an additional depression of a brake pedal by which the driver performs the brake operation, (d) a brake pedal return-depression detection section that detects return of the brake pedal depression, and (e) a driver's operation state stability judgment section that judges that, when the addition of the brake pedal depression and the return of the brake pedal depression are not detected for a certain time period by the brake pedal addition-depression detection section and the brake pedal return-depression detection section, the driver's operation state is stable, and the wheel cylinder pressure is controlled by the wheel cylinder pressure control section with the judgment of the stability of the driver's operation state by the driver's operation state stability judgment section being a control intervention condition.

Therefore, the brake assist control along the driver's intention can be achieved.

(20) The control unit further has (f) a vehicle body deceleration calculation section that calculates an actual deceleration of a vehicle body, and (g) a target vehicle body deceleration calculation section that sets the vehicle body deceleration calculated when judging that the driver's operation state is stable by the driver's operation state stability judgment section to a target vehicle body deceleration, and the wheel cylinder pressure control section increases the wheel cylinder pressure when the calculated target vehicle body deceleration is greater than the actual vehicle body deceleration, and decreases the wheel cylinder pressure when the calculated target vehicle body deceleration is smaller than the actual vehicle body deceleration.

Thus, when the driver's operation state is stable, the deceleration to attain the target deceleration can be achieved.

In the above embodiment, configuration of the hydraulic circuit having the gate-in valve is employed. However, this configuration is not limited. The other configuration could be employed as long as the brake fluid drawn from the master cylinder side can be supplied to the wheel cylinder side in the other configuration. By calculating the pressure change of the master cylinder side and the pressure change of the wheel cylinder side caused by the movement or flow of the brake fluid from the pump discharge flow quantity while taking account of the respective hydraulic pressure rigidities, a highly accurate brake assist control can be realized.

The entire contents of Japanese Patent Application No. 2010-156527 filed on Jul. 9, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A brake control apparatus comprising:
  a master cylinder pressure detection section that detects a master cylinder pressure produced by driver's brake operation;
  a pump that draws brake fluid in a master cylinder and discharges the brake fluid to a wheel cylinder that is provided in a wheel; and a control unit that controls a wheel cylinder pressure in response to the detected master cylinder pressure, and has
(a) a master cylinder pressure correction section that corrects the detected master cylinder pressure in accordance with a discharge flow quantity of the pump; and
(b) a wheel cylinder pressure control section that controls the wheel cylinder pressure by the brake fluid discharged from the pump on the basis of the corrected master cylinder pressure, wherein
a reducing master cylinder pressure is a master cylinder pressure reduction amount integral value obtained by integrating the master cylinder pressure that reduces at each predetermined time, and
the master cylinder pressure correction section corrects the master cylinder pressure on the basis of the master cylinder pressure reduction amount integral value during the control by the wheel cylinder pressure control section.

2. The brake control apparatus as claimed in claim 1, wherein:
the pump discharge flow quantity required to control the wheel cylinder pressure by the wheel cylinder pressure control section is calculated on the basis of a wheel cylinder pressure-fluid quantity characteristic.

3. The brake control apparatus as claimed in claim 2, wherein:
the control unit estimates, on the basis of the pump discharge flow quantity, the master cylinder pressure that reduces by the suction of the pump, and
the master cylinder pressure correction section corrects the master cylinder pressure on the basis of the estimated reducing master cylinder pressure.

4. The brake control apparatus as claimed in claim 1, wherein:
the master cylinder pressure correction section decreases, on the basis of a pre-set master cylinder pressure decrease amount, the master cylinder pressure corrected by the master cylinder pressure reduction amount integral value except when the control by the wheel cylinder pressure control section is in progress, and returns the corrected master cylinder pressure to the detected master cylinder pressure.

5. The brake control apparatus as claimed in claim 1, wherein:
the control unit further has
(c) a brake pedal addition-depression detection section that detects an additional depression of a brake pedal by which the driver performs the brake operation;
(d) a brake pedal return-depression detection section that detects return of the brake pedal depression; and
(e) a driver's operation state stability judgment section that judges that, when the addition of the brake pedal depression and the return of the brake pedal depression are not detected for a certain time period by the brake pedal addition-depression detection section and the brake pedal return-depression detection section, the driver's operation state is stable, and
the wheel cylinder pressure is controlled by the wheel cylinder pressure control section with the judgment of the stability of the driver's operation state by the driver's operation state stability judgment section being a control intervention condition.

6. The brake control apparatus as claimed in claim 5, wherein:
the control unit further has (f) a vehicle body deceleration calculation section that calculates an actual deceleration of a vehicle body; and
(g) a target vehicle body deceleration calculation section that sets the vehicle body deceleration calculated when judging that the driver's operation state is stable by the driver's operation state stability judgment section to a target vehicle body deceleration, and
the wheel cylinder pressure control section increases the wheel cylinder pressure when the calculated target vehicle body deceleration is greater than the actual vehicle body deceleration, and decreases the wheel cylinder pressure when the calculated target vehicle body deceleration is smaller than the actual vehicle body deceleration.

7. The brake control apparatus as claimed in claim 5, wherein:
when the addition of the brake pedal depression is detected by the brake pedal addition-depression detection section during the control intervention, the wheel cylinder pressure control section performs a pressure increase control of the wheel cylinder pressure.

8. A brake control apparatus comprising:
a master cylinder pressure detection section that detects a master cylinder pressure produced by driver's brake operation;
a pump that draws brake fluid in a master cylinder and discharges the brake fluid to a wheel cylinder that is provided in a wheel; and
a control unit having
(a) a master cylinder pressure correction section that estimates, from a discharge flow quantity of the pump, a reduction amount of the master cylinder pressure which is caused by the suction of the brake fluid by the pump, and makes a correction to the detected master cylinder pressure by adding a pressure equivalent to the estimated master cylinder pressure reduction amount to the detected master cylinder pressure; and
(b) a wheel cylinder pressure control section that controls a wheel cylinder pressure so as to increase by driving the pump on the basis of the corrected master cylinder pressure when detecting a predetermined state of the detected master cylinder pressure, wherein
the reduction amount of the master cylinder pressure is a master cylinder pressure reduction amount integral value obtained by integrating the master cylinder pressure that reduces at each predetermined time.

9. The brake control apparatus as claimed in claim 8, wherein:
the pump discharge flow quantity required to control the wheel cylinder pressure by the wheel cylinder pressure control section is calculated on the basis of a wheel cylinder pressure-fluid quantity characteristic.

10. The brake control apparatus as claimed in claim 8, wherein:
the master cylinder pressure correction section decreases, on the basis of a pre-set master cylinder pressure decrease amount, the master cylinder pressure corrected by the master cylinder pressure reduction amount integral value except when the control by the wheel cylinder pressure control section is in progress, and returns the corrected master cylinder pressure to the detected master cylinder pressure.

11. The brake control apparatus as claimed in claim 9, wherein:
the control unit further has (c) a brake pedal addition-depression detection section that detects an additional depression of a brake pedal by which the driver performs the brake operation; and (d) a brake pedal return-depression detection section that detects return of the brake pedal depression, and the predetermined state of the detected master cylinder pressure is a state where the addition of the brake pedal depression and the return of the brake pedal depression are not detected for a certain time period by the brake pedal addition-depression detection section and the brake pedal return-depression detection section, and the wheel cylinder pressure is controlled by the wheel cylinder pressure control section with a judgment of stability of driver's operation state by the detection of the predetermined state being a control intervention condition.

12. The brake control apparatus as claimed in claim 11, wherein:

the control unit further has (e) a vehicle body deceleration calculation section that calculates an actual deceleration of a vehicle body; and (f) a target vehicle body deceleration calculation section that sets the vehicle body deceleration calculated when detecting the predetermined state to a target vehicle body deceleration, and the wheel cylinder pressure control section increases the wheel cylinder pressure when the calculated target vehicle body deceleration is greater than the actual vehicle body deceleration, and decreases the wheel cylinder pressure when the calculated target vehicle body deceleration is smaller than the actual vehicle body deceleration.

13. The brake control apparatus as claimed in claim 12, wherein:

when the addition of the brake pedal depression is detected by the brake pedal addition-depression detection section during the control intervention, the wheel cylinder pressure control section performs a pressure increase control of the wheel cylinder pressure.

14. A brake control apparatus comprising:

a master cylinder pressure detection section that detects a master cylinder pressure produced by driver's brake operation;

a pump that draws brake fluid in a master cylinder and discharges the brake fluid to a wheel cylinder that is provided in a wheel; and a control unit having (a) a master cylinder pressure correction section that estimates, from a discharge flow quantity of the pump, a reduction amount of the master cylinder pressure which is caused by the suction of the brake fluid by the pump, and makes a correction to the detected master cylinder pressure by adding a pressure equivalent to the estimated master cylinder pressure reduction amount to the detected master cylinder pressure; and (b) a wheel cylinder pressure control section that drives the pump with the corrected master cylinder pressure being a reference pressure, and controls a wheel cylinder pressure so as to increase with respect to the reference pressure;

(c) a brake pedal addition-depression detection section that detects an additional depression of a brake pedal by which the driver performs the brake operation;

(d) a brake pedal return-depression detection section that detects return of the brake pedal depression; and (e) a driver's operation state stability judgment section that judges that, when the addition of the brake pedal depression and the return of the brake pedal depression are not detected for a certain time period by the brake pedal addition-depression detection section and the brake pedal return-depression detection section, the driver's operation state is stable, and the wheel cylinder pressure is controlled by the wheel cylinder pressure control section with the judgment of the stability of the driver's operation state by the driver's operation state stability judgment section being a control intervention condition.

15. The brake control apparatus as claimed in claim 14, wherein:

the pump discharge flow quantity required to control the wheel cylinder pressure by the wheel cylinder pressure control section is calculated on the basis of a wheel cylinder pressure-fluid quantity characteristic.

16. The brake control apparatus as claimed in claim 14, wherein:

the control unit estimates, on the basis of the pump discharge flow quantity, the master cylinder pressure that reduces by the suction of the pump, and the master cylinder pressure correction section corrects the master cylinder pressure on the basis of the estimated reducing master cylinder pressure.

17. The brake control apparatus as claimed in claim 14, wherein:

the control unit further has (f) a vehicle body deceleration calculation section that calculates an actual deceleration of a vehicle body; and (g) a target vehicle body deceleration calculation section that sets the vehicle body deceleration calculated when judging that the driver's operation state is stable by the driver's operation state stability judgment section to a target vehicle body deceleration, and the wheel cylinder pressure control section increases the wheel cylinder pressure when the calculated target vehicle body deceleration is greater than the actual vehicle body deceleration, and decreases the wheel cylinder pressure when the calculated target vehicle body deceleration is smaller than the actual vehicle body deceleration.

* * * * *